(12) United States Patent
Brown

(10) Patent No.: US 6,902,157 B2
(45) Date of Patent: Jun. 7, 2005

(54) VIBRATION ISOLATOR

(75) Inventor: Daniel P. Brown, Long Beach, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/409,464

(22) Filed: Apr. 8, 2003

(65) Prior Publication Data

US 2004/0201147 A1 Oct. 14, 2004

(51) Int. Cl.$^7$ .............................. B60G 11/22; F16F 1/36
(52) U.S. Cl. ...................... 267/292; 267/116; 267/136; 267/140.11; 248/634; 248/636; 248/638
(58) Field of Search .................................. 267/195, 292, 267/293, 284, 116, 136, 139, 140.11, 140.13, 152, 153, 141.3, 141.7; 248/634, 635, 636, 637, 638; 11/11

(56) References Cited

U.S. PATENT DOCUMENTS

| | | | | | |
|---|---|---|---|---|---|
| 2,202,940 A | * | 6/1940 | Armington | ............... | 267/141.3 |
| 2,322,844 A | * | 6/1943 | Goldschmidt | ............ | 267/141.7 |
| 2,575,858 A | * | 11/1951 | Bennett | ...................... | 248/606 |
| 2,999,707 A | * | 9/1961 | Kniepkamp et al. | ........ | 403/225 |
| 3,484,063 A | * | 12/1969 | Peirce | ........................ | 248/555 |
| 3,879,075 A | * | 4/1975 | Hale | ........................... | 293/142 |
| 3,998,499 A | * | 12/1976 | Chiarotto | ..................... | 384/36 |
| 4,378,936 A | * | 4/1983 | Brenner | ................. | 267/140.13 |
| 4,711,423 A | * | 12/1987 | Popper | ....................... | 248/635 |
| 5,377,772 A | * | 1/1995 | Gien | ....................... | 175/325.5 |
| 6,189,874 B1 | * | 2/2001 | Carlson | ...................... | 267/141 |
| 6,224,047 B1 | * | 5/2001 | Gwinn | ....................... | 267/292 |
| 2002/0145241 A1 | * | 10/2002 | Rawson | .................. | 267/141.7 |

FOREIGN PATENT DOCUMENTS

| | | | |
|---|---|---|---|
| EP | 0969231 | * | 6/2000 |
| EP | 1132244 | * | 9/2001 |
| GB | 2351138 | * | 12/2000 |

* cited by examiner

Primary Examiner—Robert A. Siconolfi
Assistant Examiner—Devon Kramer
(74) Attorney, Agent, or Firm—Renner, Otto, Boisselle & Sklar, LLP

(57) ABSTRACT

A vibration isolation assembly comprises a base, a plunger and an annulus of resilient material between the base and plunger. The base has a pair of oppositely inclined, internal, tapered surfaces connected to each other which define an opening though the base. The tapered surfaces of the base contact corresponding external surfaces of the annulus. The plunger has an inclined surface substantially parallel to one of the internal surfaces and a second surface within the opening and facing the pair of tapered surfaces. The inclined surface and the second surface of the plunger engage corresponding internal surfaces of the annulus. In this device vibration creates a load on the annulus which is entirely compressive, or nearly so.

9 Claims, 3 Drawing Sheets

VIBRATION ISOLATOR

FIELD OF THE INVENTION

The present invention relates to vibration dampers and isolators.

BACKGROUND OF THE INVENTION

Many engineering applications require vibration isolation. One type of prior art vibration isolator includes a vulcanized rubber insert between a pair of metal mounting plates. In many instances such devices have lacked durability and ease of repair. The applications have placed the rubber inserts in sheer and tension, shortening the life of the insert. When replacement has been required, it has been impossible to separate the vulcanized rubber from the mounting plates. Therefore the entire device has required replacement.

SUMMARY OF THE INVENTION

The present invention teaches how to make a vibration isolator assembly that has a long life and is easy to repair. An isolator made following the teachings of the present invention includes a base and plunger with an annulus of elastomeric material between them. The base and plunger have opposed surfaces that transmit primarily compressive loads to the annulus. The base captures the annulus with a pair of oppositely inclined faces, and the plunger has one conical face and one cylindrical face that bear on the annulus. This arrangement holds the annulus in place without vulcanizing it to any other part. Moreover, the annulus can be proportioned to be under a compressive preload when it is in place in the base. As a result the annulus has a long life and is easy to replace when necessary.

DESCRIPTION OF THE INVENTION

Figure 1:
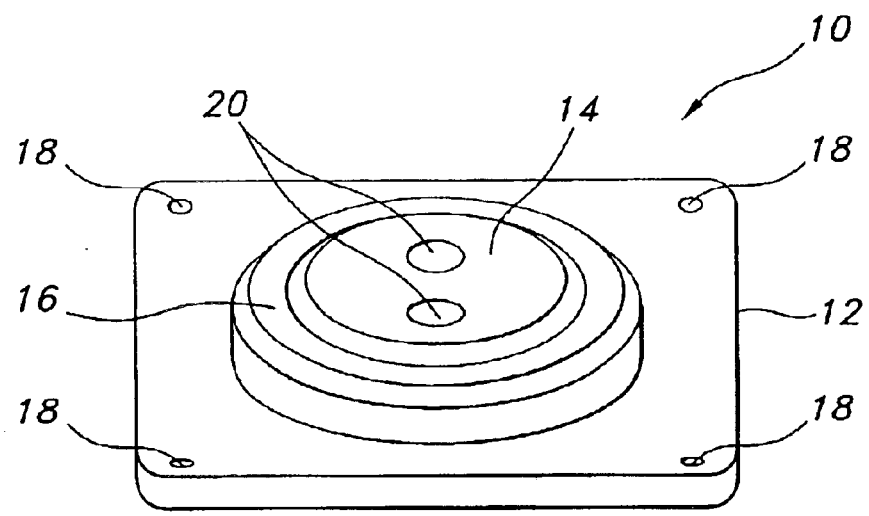
FIG. 1 is a perspective illustration of a vibration isolator constructed following the teachings of the present convention.
Figure 2:
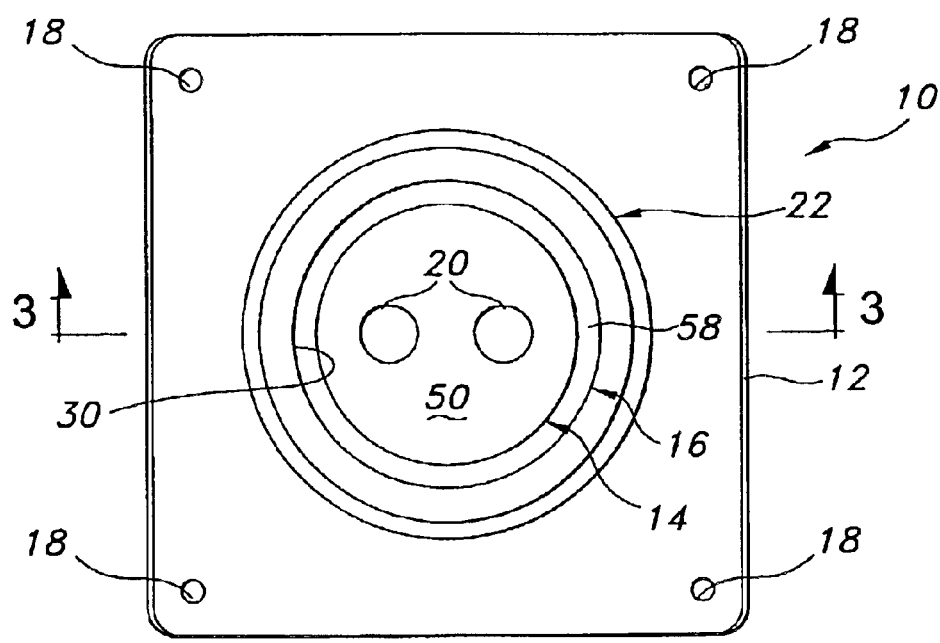
FIG. 2 is a top plan view of the vibration isolator of FIG. 1.

The vibration isolator assembly 10 is constructed following the teachings of the present invention. The vibration isolator assembly 10 includes a base 12, a plunger 14, and an annulus 16 of elastomeric material. The assembly 10 is provided with mounting holes 18. The base 10, which has a more or less square shape overall, has a mounting hole 18 in each corner. The plunger is provided with two mounting holes 20. The placement and number of mounting holes 18, 20 is completely a matter of suiting the item to be mounted to the vibration isolator assembly 10 and the structure to which it is to be mounted. Accordingly, the number and location of mounting holes 18, 20, as well as whether they are threaded or not, are a matter of design choice and are variable to suit particular applications.

Figure 3:
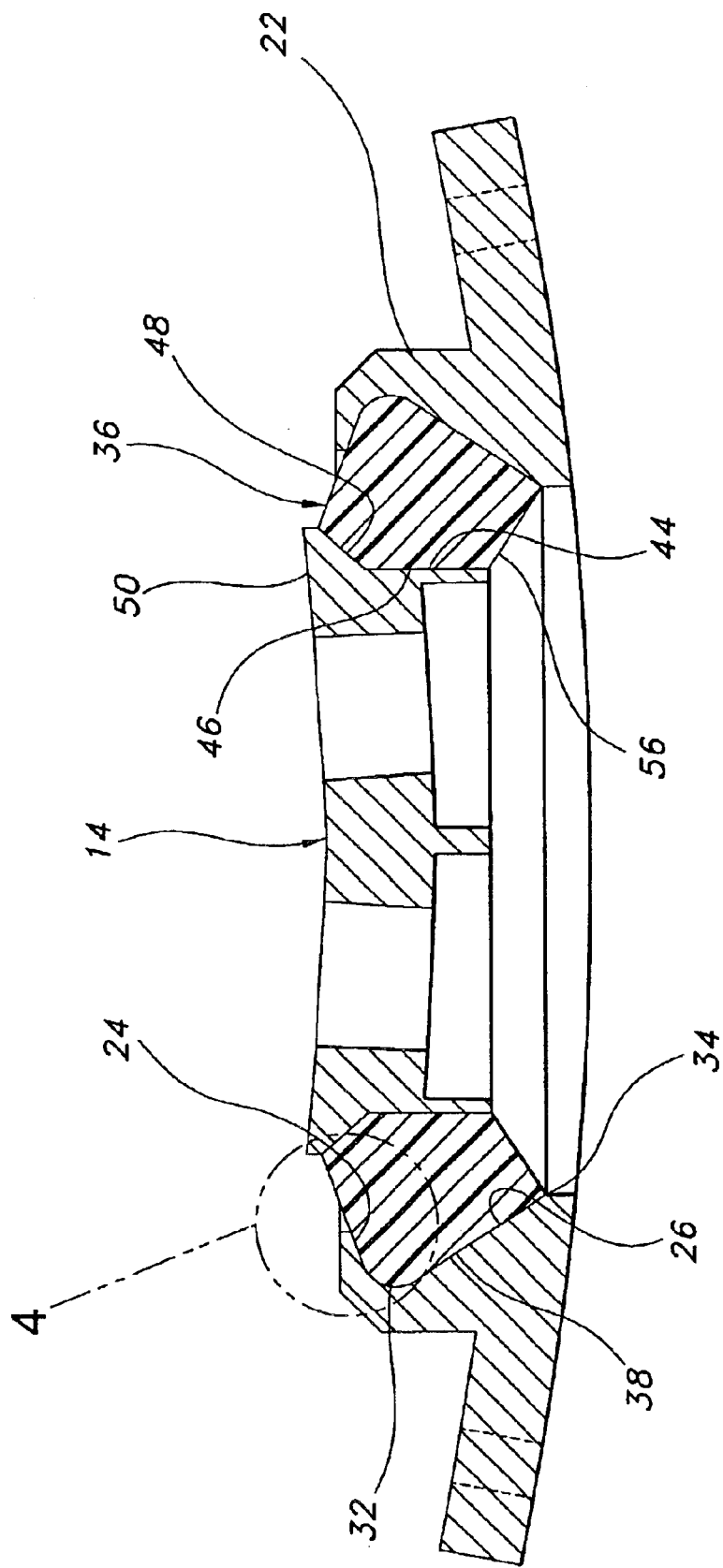
FIG. 3 is a cross section view looking in the direction of arrows 3—3 of FIG. 2.
Figure 4:
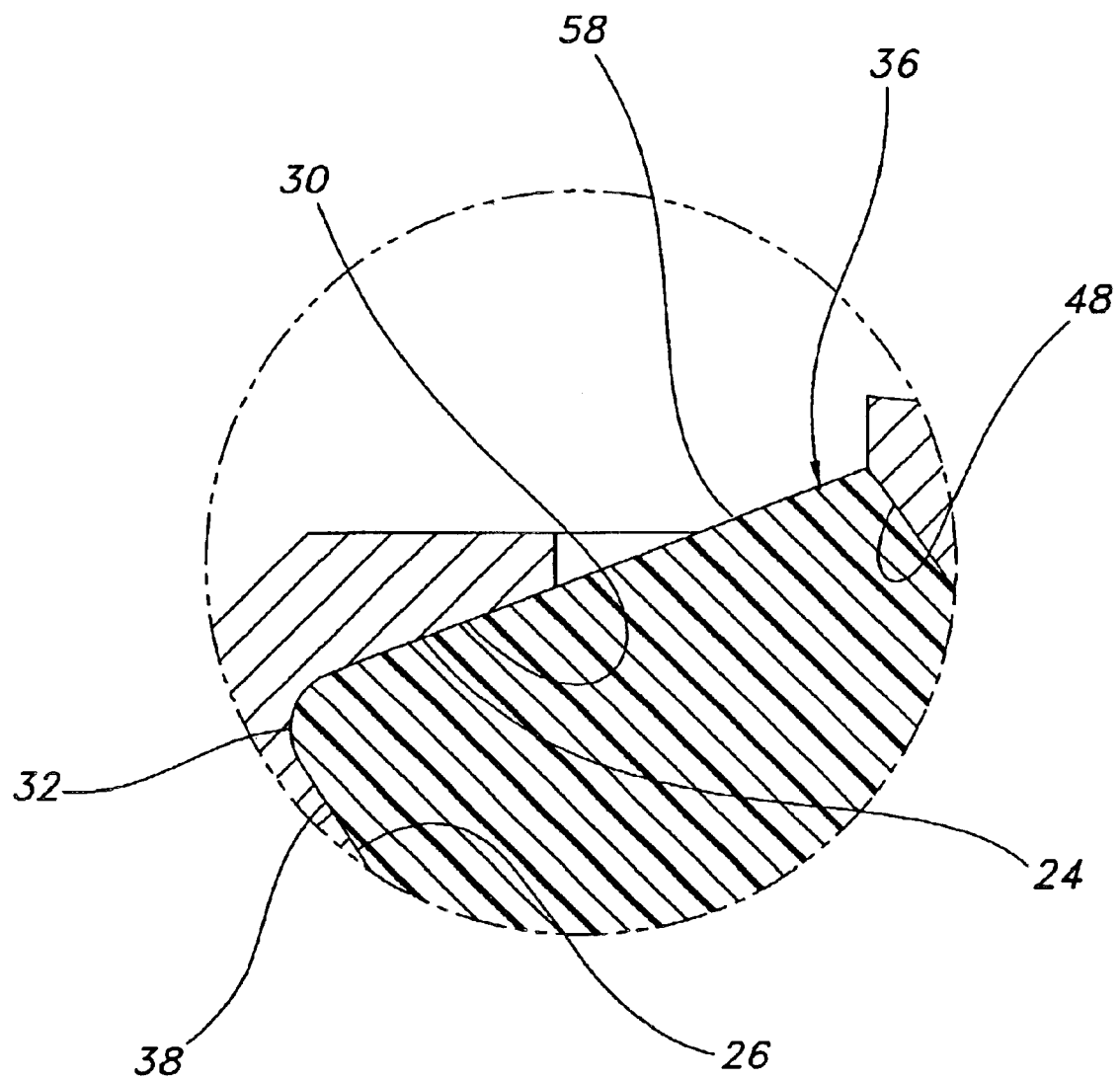
FIG. 4 is an enlarged view of a portion of FIG. 3.

In the description that follows, the orientation of the vibration isolator assembly 10 is assumed to be as shown in FIG. 3, with the base 12 horizontal and the axis of the plunger 14 vertical. Accordingly, the words "up", "down", "horizontal," "vertical", and the like derive their meanings from the orientation of the parts in FIG. 3.

The base 12 is generally square in plan view. It has a centrally located boss 22 that is symmetric about a vertical axis. In elevation view the base 12 is curved (FIG. 3), but that is a matter of design choice to fit the base to a support structure. The base 12 could as easily be shaped to fit a flat structure.

The annulus 16 is captured within the boss 22. To this end the boss 22 includes an upper mounting face 24 and a lower mounting face 26. The upper and lower mounting faces 24, 26 include an angle of slightly less than 90° and are at about a 45° angle to the axis of the boss. The innermost edge 30, i.e., the edge with the smallest radius, of the upper mounting face 24 makes a circular opening in the top of the boss. The corner 32 where the two mounting faces meet is rounded, and at its widest makes a circle larger than the top opening defined by the inner edge 30. Accordingly, the upper and lower mounting faces 24, 26 are each conical.

The lower mounting face 26 has a circular edge 34 that is smaller than the top opening defined by the edge 30. The annulus 16 has a top and a bottom face 36, 38, respectively that correspond with and contact the upper and lower mounting faces 24, 26, respectively, of the boss 22.

The plunger 14 is shaped to fit within the annufus 16. The plunger 14 has a cylindrical lower end 44 which fits through a corresponding opening 46 through the center of the annulus 16. The cylindrical lower end portion 44 of the plunger 14 is positioned vertically between the circular edges 30 at the top and at the bottom of the faces 24 and 26, respectively. Accordingly, the plungers cylindrical lower end 44 transmits horizontal forces through the annulus 16 between the plunger 14 and the base 12, resulting in horizontal compressive loads on the annulus.

The plunger 14 has a tapered or conical surface 48 extending upward and outward from the top of the cylindrical lower end portion 44. The conical plunger surface 48 begins in a plane slightly below that of the edge 30 of the upper base mounting face 24, and it is parallel to the lower base mounting surface 26. The tapered conical surface 48 of the plunger 14 serves to transmit downward loads imposed on the plunger (or upward loads imposed on the base 12) through the annulus 16. Because the tapered surface 48 of the plunger 14 is parallel to the opposing lower base mounting face 26, vertical loads result in compression of the annulus 16. The plunger conical surface 48 ends at the plunger top 50, a cylindrical element with the diameter which is less than the diameter of the bottom opening defined by the edge 34 bf the base 12, and therefore also less than the diameter of the upper opening defined by the edge 30 of the base.

The arrangement of the mounting faces 24, 26 of the base 12 and the cylindrical and tapered faces 44, 48 of the plunger 14 result in compressive loads on the annulus 16 whether the loads are applied in the horizontal plane or downward in the vertical plane, or a combination.

The annulus 16 is not completely bounded by the surfaces of the base 12 and plunger 14. Instead the annulus 16 has two free surfaces 56, 58. Conical annular surface 58 of the annulus 16 extends from the top opening 30 of the boss 22 to the conical surface 48 of the plunger 14. An opposite surface 56 of the annulus 16 extends from the bottom circle 34 of the base 12 to the lower, cylindrical portion 44 of the plunger 14. These two free surfaces 56, 58 allow the annulus 16 to bulge when compressive loads are applied to it.

The annulus 16 may be made of any suitable elastic material. What material is suitable is determined by the loads to be carried and natural frequency of the system. Suitable materials include silicone and fluorosilicone type materials with a durometer of 75 to 80. Other materials may also prove suitable, but an annulus 16 of these materials has worked effectively when four vibration isolators, symmetrically located on a circle 12.1 inches in diameter, are used to support a 79 lb. test weight.

The outside dimensions of the annulus 16 are made slightly oversize compared to the internal dimensions of the base 12. This results in a compressive preload when the annulus 16 is installed in the base 12. The central opening through the annulus is made slightly under size. When the plunger 14 is installed in place, the compressive preload on the annulus 16 is increased. The extent of the preload is determined by the desired natural frequency of the vibration isolator assembly 10 in its intended application. Accordingly the inclined upper and lower mounting faces 24, 26 of the base 12 and the cylindrical and inclined surfaces 44, 48 of the plunger 14 serve to control the shape of the annulus 16, and when horizontal and vertical vibrations are applied serve to cause the annulus to carry the resulting loads substantially in compression rather than in sheer. The arrangement of base 12, annulus 16, and plunger 14 provides a low profile, allowing the vibration isolator assembly 10 to be used in tight spaces. At the same time, when the annulus 16 becomes worn, it can be readily replaced by removing the plunger 14 and distorting the annulus to remove it from the base 12.

What is claimed is:

1. A vibration isolation assembly comprising a base, a plunger and an annulus of resilient material disposed between the base and plunger,
    the base having a pair of oppositely inclined, internal, tapered surfaces connected to each other and defining an opening though the base, the tapered surfaces of the base contacting corresponding external surfaces of the annulus,
    the plunger having an inclined surface substantially parallel to one of the internal surfaces and a second surface within the opening and facing the pair of tapered surfaces, the inclined surface and the second surface of the plunger engaging corresponding internal surfaces of the annulus,
    the tapered surfaces of the base and the inclined and second surfaces of the plunger being surfaces of revolution and sharing a common axis,
    wherein the second surface of the plunger is parallel to the common axis,
    wherein the annulus is unattached to the base and the plunger, wherein the plunger is removable from the base and the annulus, and wherein the annulus is removable from the base after removal of the plunger.

2. The vibration isolation assembly of claim 1 wherein the oppositely inclined surfaces of the base capture the annulus to hold it in position.

3. The vibration isolation assembly of claim 2 wherein the annulus has two free surfaces.

4. The vibration isolation assembly of claim 3 wherein one of the free surfaces of the annulus forms a continuation of one of the tapered surfaces of the base.

5. A vibration isolation assembly comprising a base, a plunger and an annulus of resilient material disposed between the base and plunger,
    the base having a pair of oppositely inclined, internal, tapered surfaces connected to each other and defining an axially extending opening though the base, the tapered surfaces of the base contacting corresponding external surfaces of the annulus,
    the plunger having an inclined surface substantially parallel to one of the internal surfaces and a second surface within the axially extending opening through the base and facing the pair of tapered surfaces, the second surface being a generally cylindrical surface coaxial with the opening through the base, the inclined surface and the second surface of the plunger engaging corresponding internal surfaces of the annulus,
    wherein the annulus is unattached to the base and the plunger, wherein the plunger is removable from the base and the annulus, and wherein the annulus is removable from the base after removal of the plunger.

6. A vibration isolation assembly comprising a base, an annulus of resilient material, and a plunger;
    the base including a boss having a pair of oppositely inclined internal tapered surfaces connected to each other and defining an opening through the base;
    the annulus having internal surfaces which define a central opening and external surfaces which contact the tapered surfaces of the boss to capture the annulus within the boss;
    the plunger being shaped to fit through the opening in the annulus and having inclined surfaces substantially parallel to one of the internal surfaces and a second surface within the opening and facing the pair of tapered surfaces, the inclined surface and the second surface of the plunger engaging corresponding internal surfaces of the annulus;
    wherein the annulus is unattached to the base and the plunger, wherein the plunger is removable from the base and the annulus, and wherein the annulus is removable from the base after removal of the plunger;
    wherein the surfaces of the boss and the surfaces of the plunger are surfaces of revolution and share a common axis; and
    wherein the second surface of the plunger is parallel to the common axis.

7. The vibration isolation assembly of claim 6 wherein the annulus has two free surfaces.

8. The vibration isolation assembly of claim 7 wherein one of the free surfaces of the annulus forms a continuation of one of the tapered surfaces of the boss.

9. A method of repairing the vibration assembly of claim 6 when the annulus becomes worn, said method comprising the steps of:
    removing the plunger from the base and the annulus;
    removing the worn annulus from the base;
    capturing a new annulus within the base; and
    replacing the plunger.

* * * * *

UNITED STATES PATENT AND TRADEMARK OFFICE
CERTIFICATE OF CORRECTION

PATENT NO. : 6,902,157 B2
DATED : March 8, 2003
INVENTOR(S) : Daniel P. Brown

It is certified that error appears in the above-identified patent and that said Letters Patent is hereby corrected as shown below:

Column 1,
Line 4, before "Field of the Invention" please insert the following:
-- This invention was made with Government support under Subcontract No. E80011 The Boeing Company, of Prime Contract No. N00019-97-C-0009, awarded by the Department of the Navy. The government has certain rights in this invention. --.

Signed and Sealed this

Eleventh Day of October, 2005

JON W. DUDAS
*Director of the United States Patent and Trademark Office*